United States Patent
Imamura

(10) Patent No.: US 6,746,161 B2
(45) Date of Patent: Jun. 8, 2004

(54) ELECTRICAL DISTRIBUTION BOARD WITH INTERCONNECTED OPTICAL REPEATERS AND ELECTRICAL BREAKERS

(75) Inventor: Yoichi Imamura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 09/810,011

(22) Filed: Mar. 15, 2001

(65) Prior Publication Data

US 2002/0015565 A1 Feb. 7, 2002

(30) Foreign Application Priority Data

Mar. 17, 2000 (JP) ........................................ 2000-077122
Feb. 28, 2001 (JP) ........................................ 2001-054615
Mar. 14, 2001 (JP) ........................................ 2001-072272

(51) Int. Cl.$^7$ ............................. G02B 6/36; G02B 6/44; G02B 6/00; H01R 13/60; H01R 13/66
(52) U.S. Cl. ...................... 385/88; 385/101; 385/134; 439/535
(58) Field of Search ................................ 385/101, 134, 385/135; 439/535, 502; 174/150; 361/826, 828

(56) References Cited

U.S. PATENT DOCUMENTS

| 5,448,675 A | * | 9/1995 | Leone et al. ................ 385/135 |
| 5,712,942 A | * | 1/1998 | Jennings et al. ............ 385/134 |
| 6,040,759 A | * | 3/2000 | Sanderson ............. 340/310.01 |
| 6,466,718 B1 | * | 10/2002 | Linnell ........................ 385/100 |
| 2003/0012542 A1 | * | 1/2003 | Glynn ......................... 385/134 |

* cited by examiner

Primary Examiner—Chandrika Prasad
(74) Attorney, Agent, or Firm—Hogan & Hartson, LLP

(57) ABSTRACT

An electrical distribution board that stores terminals of a signal cable connected to a communication network and an electrical power cable connected to an electrical distribution cable, the electrical distribution board comprising: an in-building electrical distribution breaker inserted between the electrical power cable and the in-building distribution cable; a gateway that interfaces the communication network with the in-building network; and a plurality of optical repeaters, each having a bi-directional conversion function between an electrical signal and an optical signal between an electrical signal input/output terminal and an optical signal input/output terminal, and having an electrical signal input/output terminal that is connected to an electrical signal input/output terminal for in-building network connection of the gateway, wherein the optical signal input/output terminal is connected to an optical fiber cable of the in-building network. In addition, junction boxes, outlet boxes, plugs with electrical codes, outlet box terminal boards, table taps and the like are prepared to form an in-building network. In-building equipment can be connected to the outlet boxes and the table taps.

6 Claims, 10 Drawing Sheets

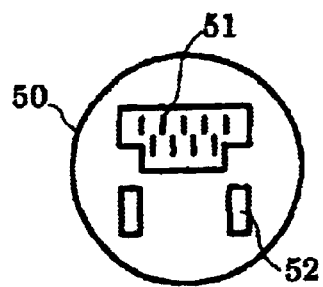
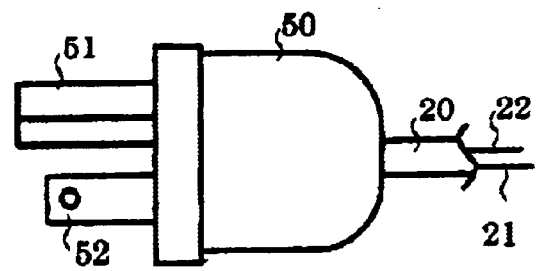
Fig. 4(a)  Fig. 4(b)
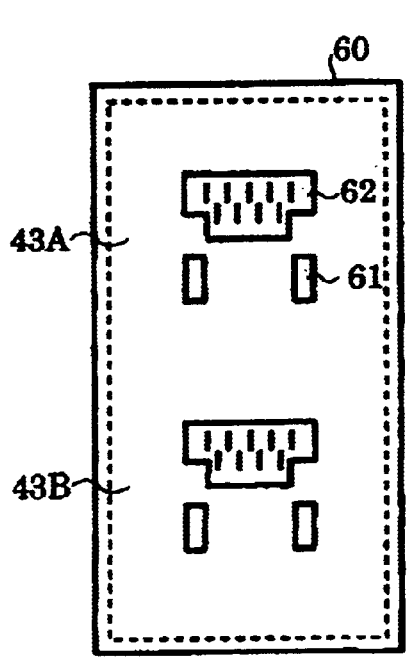
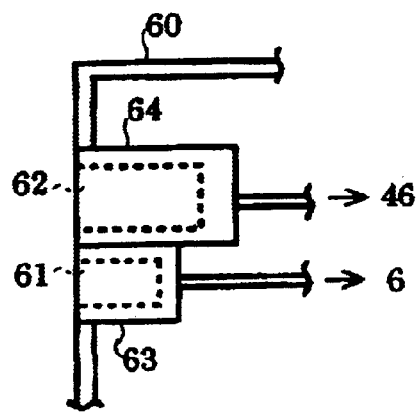
Fig. 4(c)  Fig. 4(d)

ELECTRICAL DISTRIBUTION BOARD WITH INTERCONNECTED OPTICAL REPEATERS AND ELECTRICAL BREAKERS

TECHNICAL FIELD OF THE INVENTION

The present invention relates to an in-building network system, and an electrical distribution board, an outlet box and the like that are used to construct the system.

BACKGROUND TECHNOLOGY

As electrical appliances at home and offices are further computerized, standardization of interfaces are promoted for connecting electrical appliances through networks in order to realize data exchange, remote-control and office automation. IEEE 1394 serial interfaces and USB interfaces are well known as typical interfaces among those interfaces. For example, an IEEE 1394 serial interface uses many branch nodes and twist pair cables. This interface is characterized in that appliances can be hot plugged at various locations at home or in office.

SUMMARY

One embodiment of the present invention provides an electrical distribution board that stores terminals of a signal cable connected to a communication network and an electrical power cable connected to an electrical distribution cable, the electrical distribution board comprising:
an in-building electrical distribution breaker inserted between the electrical power cable and the in-building distribution cable; a gateway that interfaces the communication network with the in-building network; and a plurality of optical repeaters, each having a bi-directional conversion function between an electrical signal and an optical signal between an electrical signal input/output terminal and an optical signal input/output terminal, and having an electrical signal input/output terminal that is connected to an electrical signal input/output terminal for in-building network connection of the gateway, wherein the optical signal input/output terminal is connected to an optical fiber cable of the in-building network.

Another embodiment of the present invention provides an electrical distribution board that stores terminals of a signal cable connected to a communication network and of an electrical power cable connected to an electrical distribution cable, the electrical distribution board comprising:
an in-building electrical distribution breaker inserted between the electrical power cable and an in-building electrical distribution cable; a gateway that interfaces the communication network with the in-building network; and
a plurality of optical repeaters, each having a bi-directional conversion function between an electrical signal and an optical signal between an electrical signal input/output terminal and an optical signal input/output terminal, and having an electrical signal input/output terminal that is connected to an electrical signal input/output terminal for in-building network connection of the gateway, wherein the optical signal input/output terminal is connected to an optical fiber cable of the in-building network, and wherein the gateway is externally attached to a casing that stores the in-building electrical distribution breaker and the optical repeater.

Another embodiment of the present invention provides a junction box for in-building network that stores terminals of an in-building complex cable including an in-building electrical distribution cable and an optical fiber cable, comprising: a distribution apparatus that is connected to the in-building electrical distribution cable and distributes the in-building electrical distribution cable; and an optical repeater having a bi-directional conversion function between an electrical signal and an optical signal between electrical signal input/output terminals and optical signal input/output terminals, wherein an optical fiber cable on an electrical distribution board side is connected to one of the optical signal input/output terminals and an optical fiber cable on an outlet box side is connected to the other of the optical signal input/output terminals.

Another embodiment of the present invention provides an outlet box that stores terminals of an in-building complex cable including an in-building electrical distribution cable and an optical fiber cable, comprising:
an electrode plug receptor section that is connected to the in-building electrical distribution cable; a plurality of optical repeaters, each having a bi-directional conversion function between an electrical signal and an optical signal between an electrical signal input/output terminal and an optical signal input/output terminal and having an optical signal input/output terminal that is connected to the optical fiber cable; and a serial interface cable connection terminal that is connected to an electrical signal input/output terminal of the optical repeater.

Another embodiment of the present invention provides a plug with electrical code, the plug being connected to one end of an electrical code including a power supply line that supplies power source electrical power to an appliance and a signal cable that connects the appliance and an in-building network, and comprising an electrode plug that is electrically connected to the power supply line and a serial interface plug that is electrically connected to the signal cable.

Another embodiment of the present invention provides a plug with electrical cord, the plug being connected to one end of an electrical cable including a power supply line that supplies power source electrical power to an appliance and a signal cable that connects the appliance and an in-building network, and comprising an electrode plug that is electrically connected to the power supply line and an optical connector that is connected to the optical fiber cable.

Another embodiment of the present invention provides an outlet box terminal board to be connected to a plug with electrical cord, the plug being connected to one end of an electrical cord including a power supply line that supplies power supply electrical power to an appliance and a signal cable that connects the appliance and an in-building network and comprising an electrode plug that is electrically connected to the power supply line and a serial interface plug that is electrically connected to the signal cable, the outlet box terminal board comprising: an electrode plug receptor section that is connected to an in-building electrical distribution cable and receives the electrode plug, and a serial interface cable connection terminal that is disposed adjacent the electrode plug receptor section and connected to an electrical signal input/output terminal of an optical repeater and receives the serial interface plug.

Yet another embodiment of the present invention provides an in-building network system comprising: an electrical distribution board that receives an electrical power cable that is connected to an electrical distribution line and a signal cable that is connected to a network and an outlet box that is connected to the electrical distribution board through in-building complex cables including an electrical distribution cable and an optical fiber cable, wherein the outlet box is equipped with an electrical plug receptor section that connects to an electrical plug and an optical fiber connector receptor section that receives an optical fiber connector; and a gate that opens an opening section of the optical fiber connector receptor section when a tip of the electrical plug is inserted in the electrical plug receptor section and closes the opening section of the optical fiber connector receptor section when the tip of the electrical plug is pulled out the electrical plug receptor section.

Still another embodiment of the present invention provides an in-building network system comprising: an electrical distribution board that stores a signal cable connected to a communication network and an electrical power cable connected to an electrical distribution cable, the electrical distribution board comprising an in-building electrical distribution breaker inserted between the electrical power cable and an in-building electrical distribution cable, a gateway that interfaces between the communication network and the in-building network, and a plurality of optical repeaters, each having a bi-directional conversion function between an electrical signal and an optical signal and having an electrical signal input/output terminal that is connected to an electrical signal input/output terminal for in-building network connection of the gateway and an optical signal input/output terminal that inputs and outputs a signal corresponding to an electrical signal provided by the bi-directional conversion function and is connected to an optical fiber cable of the in-building network; and an outlet box that stores terminals of in-building complex cables including the in-building electrical distribution cable and the optical fiber cable, the outlet box comprising an electrode plug receptor section that is connected to the in-building electrical distribution cable, a plurality of optical repeaters, each having a bi-directional conversion function between an electrical signal and an optical signal and having an optical signal input/output terminal that is connected to the optical fiber cable and an electrical signal input/output terminal that inputs and outputs an electrical signal corresponding to the optical signal provided by the bi-directional conversion function, and a pair of serial interface cable connection terminals that is connected to the electrical signal input/output terminal of the optical repeater.

Still another embodiment of the present invention provides a table tap comprising: an electrical cord including a power supply line that supplies power supply electrical power to an appliance and a signal cable that connects the appliance and an in-building network; a plug connected to one end of the electrical cord and having an electrode plug that is electrically connected to the power supply line and a serial interface plug that is electrically connected to the signal cable; and a tap that is connected to the other end of the electrical cord and having an electrode plug receptor section that is electrically connected to the power supply line and a serial interface cable connecting terminal that is electrically connected to the signal cable.

BRIEF DESCRIPTION OF THE DRAWINGS

FIG. 4 shows illustrations of an internal structure of an outlet box and a structure of a plug to be inserted in the outlet box, FIG. 4(a) shows a front view of the plug, FIG. 4(b) shows a side view in part of the plug with an electrical cord, FIG. 4(c) shows a front view of the outlet box, and FIG. 4(d) generally shows a side view in part of the outlet box.

DETAILED DESCRIPTION

Figure 1:
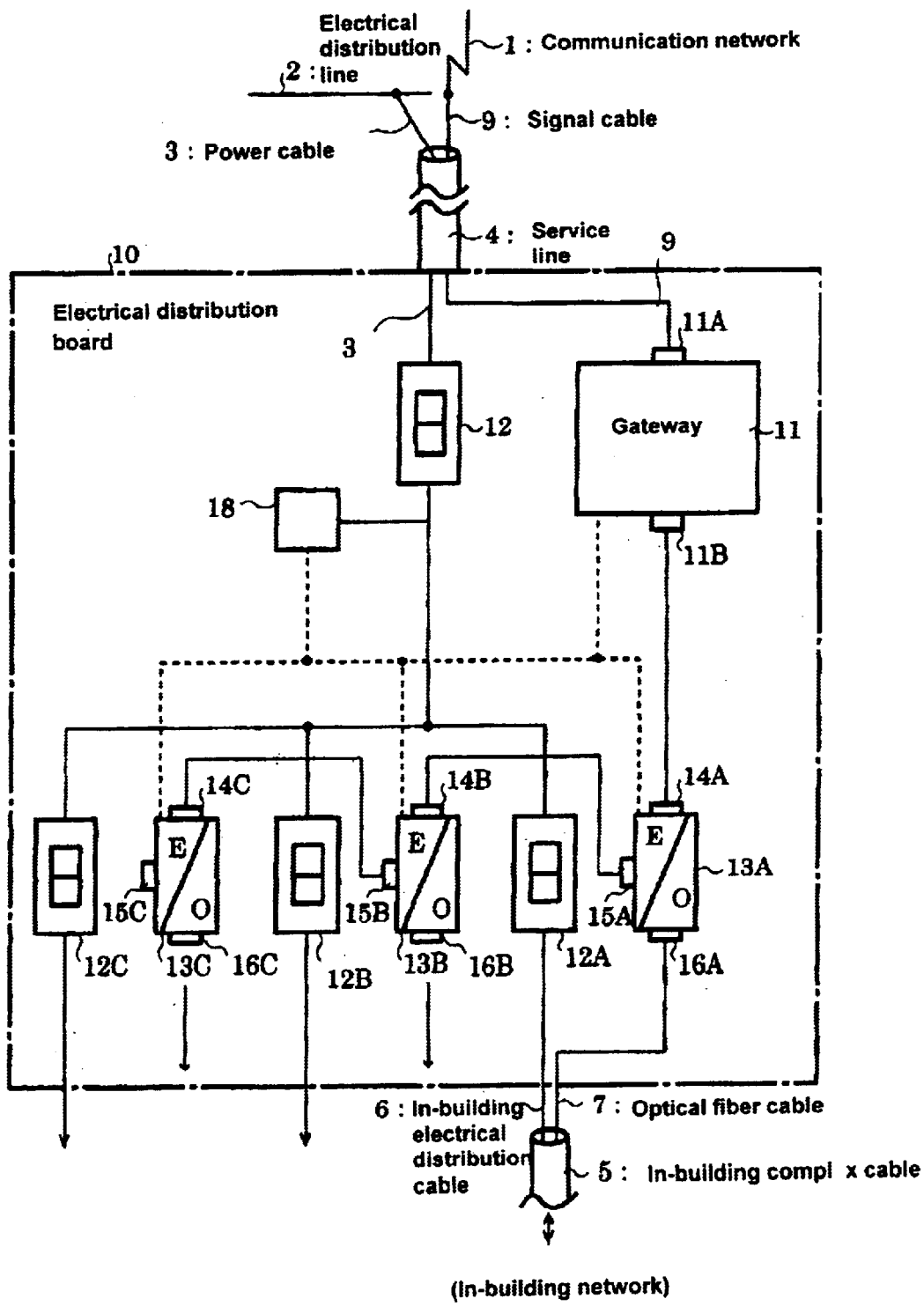
FIG. 1 shows a block diagram of an internal structure of an electrical distribution board used in a in-building network according to the invention.

However, the background technology described above has the following problems that need to be solved. In other to construct the network described above, cables for network need to be installed at home or offices. Also, in addition to the power supply cable for the appliances, data-link cables need to be attached to the appliances and connected to nodes of the network. However, the cable installation may be complicated, and a cosmetic view of the interior may be marred. Also, the cable connection work is complicated, and malfunctions may occur due to bad connections. On the other hand, networks using radio waves without using cables are known. However, this type of network may lead to high facility installation costs. Also, strong radio waves may be harmful to human, and weak radio waves are not suitable for networks in a building in which rooms are separated by walls.

The present invention employs the following structures to solve the problems described above.

Structure 1

An electrical distribution board that stores ends of a signal cable connected to a communication network and an electrical power cable connected to electrical distribution cables, the electrical distribution board comprising: in-building electrical distribution breakers inserted between the electrical power cable and the in-building distribution cables; a gateway that interfaces the communication network with the in-building network; and a plurality of optical repeaters, each having a bi-directional conversion function between an electrical signal and an optical signal between an electrical signal input/output terminal and an optical signal input/output terminal, and having an electrical signal input/output terminal that is connected to an electrical signal input/output terminal for in-building network connection of the gateway, wherein the optical signal input/output terminal is connected to an optical fiber cable of the in-building network.

The electrical distribution board receives terminals of both of the electrical cable that is connected to the electrical distribution cable and the signal cable that is connected to the network. The in-building network that uses the electrical distribution board is constructed from in-building complex cables that include in-building electrical distribution cables and optical fiber cables, an outlet box and the like. The outlet box is equipped with electrical plug receptor sections and serial interface cable connection terminals, such that users in the building can construct a network without being aware of the network. The communication network may include, for example, wide area networks such as the Internet, or local area networks such as intranet. The signal cable that connects the communication network and the electrical distribution board may be coaxial cabled, pair cables or optical fiber cables. Since the in-building network uses optical fiber cables as main lines, problems of signal attenuation or the like do not occur.

Structure 2

An electrical distribution board that stores an end of an electrical power cable connected to electrical distribution cables, the electrical distribution board comprising: in-building electrical distribution breakers inserted between the electrical power cable and an in-building electrical distribution cable; a gateway that interfaces the communication network with the in-building network; and a plurality of optical repeaters, each having a bi-directional conversion function between an electrical signal and an optical signal between an electrical signal input/output terminal and an optical signal input/output terminal, and having an electrical signal input/output terminal that is connected to an electrical signal input/output terminal for in-building network connection of the gateway, wherein the optical signal input/output terminal is connected to an optical fiber cable of the in-building network, and wherein the gateway is externally attached to a casing that stores the in-building electrical distribution breakers and the optical repeaters.

In Structure 1, the gateway is mounted inside the case of the electrical distribution board. However, in Structure 2, the gateway is externally attached to the case of the electrical distribution board.

Structure 3

In the electrical distribution board described in Structure 1 or Structure 2, the optical repeaters in plurality are connected in daisy chain through electrical signal input/output terminals.

Structure 4

In the electrical distribution board described in Structure 1 or Structure 2, a plurality of optical repeaters are connected in a tree-form through electrical signal input/output terminals.

When a plurality of optical fiber cables are provided for connecting the electrical distribution board and the in-building network, a plurality of optical repeaters can be provided inside the electrical distribution board. Since separations between the optical repeaters within the electrical distribution board are short, they can be mutually connected to one another in daisy chain by the electrical signal input/output terminals. For in-building networks, optical signal input/output terminals may be used. As a result, the structure within the electrical distribution board becomes simple and the cost thereof becomes lower.

Structure 5

In the electrical distribution board according to any one of Structure 1 through Structure 3, the electrical signal input/output terminals are IEEE 1394 serial interface cable connection terminals.

The internationally standardized IEEE 1394 serial interface is most preferable for in-building networks that use the in-building complex cables.

Structure 6

In the electrical distribution board according to any one of Structure 1 through Structure 3, each of the optical repeaters is isolated in terms of network from the exterior of the distribution board (an upstream side) by a bridge function.

The bridge faction of the optical repeater restricts problems that may be caused by interruption of network operations within a specified range, in other words, within the electrical distribution board, and prevents the problems from propagating through the entire network.

Structure 7

A junction box for in-building network that stores an end of an in-building complex cable including an in-building electrical distribution cable and an optical fiber cables, comprising: a distribution apparatus that is connected to the in-building electrical distribution cable and distribute the in-building electrical distribution cable; and an optical repeater having a bi-directional conversion function between an electrical signal and an optical signal between an electrical signal input/output terminal and an optical signal input/output terminal, wherein an optical fiber cable on an electrical distribution board side is connected to one of the optical signal input/output terminals and an optical fiber cable on an outlet box side is connected to the other of the optical signal input/output terminals.

Within the junction box for branching in-building wirings and the in-building network, an optical repeater which is similar to the one used in the electrical distribution board is provided. The junction box can be disposed at any of desired locations within the in-building networks. Therefore, the networks can be freely expanded or modified.

Structure 8

In the junction box according to Structure 7, a plurality of optical repeaters are connected in daisy chain through electrical signal input/output terminals.

Structure 9

In the junction box according to Structure 7, a plurality of optical repeaters are connected in a tree-form through electrical signal input/output terminals.

In order to conduct multiple branching in the junction box, a plurality of optical repeaters are provided in a similar manner as provided in the electrical distribution board. The optical repeaters within the junction box in this case can be mutually connected by using electrical signal input/output terminals, such that effects similar to those obtained by the electrical distribution board can be obtained.

Structure 10

In the junction box according to Structure 7 or Structure 8, the electrical signal input/output terminals are IEEE 1394 serial interface cable connection terminals.

It is the same as Structure 5.

Structure 11

In the junction box according to Structure 7 or Structure 8, at least one of the optical repeaters at an uppermost level has a bridge function whereby the network on an upstream side of the optical repeater at the uppermost level isolated in terms of network from the network on a downstream side of the optical repeater.

The bridge faction of the optical repeater restricts problems that may be caused by interruption of network operations within a specified range, in other words, within the junction box, and prevents the problems from propagating through the entire network.

Structure 12

An outlet box that stores an end of an in-building complex cable including an in-building electrical distribution cable and an optical fiber cable, comprising: an electrode plug receptor section that is connected to the in-building electrical distribution cable; a plurality of optical repeaters, each having a bi-directional conversion function between an electrical signal and an optical signal between an electrical signal input/output terminal and an optical signal input/output terminal and having an optical signal input/output terminal that is connected to the optical fiber cable; and a serial interface cable connection terminal that is connected to an electrical signal input/output terminal of the optical repeater.

Since the outlet box may be directly connected to in-building appliances, the serial interface cable connection terminal that is connected to the electrical signal input/output terminal of the optical repeater is provided. As a result, connection on the side of the in-building appliances becomes simplified and the cost thereof is lowered compared to the optical connection.

Structure 13

In the outlet box according to Structure 12, a plurality of optical repeaters are connected in daisy chain through electrical signal input/output terminals, and the optical repeaters are equipped with serial interface cable connection terminals.

Structure 14

In the outlet box according to Structure 12, a plurality of optical, repeaters are connected in a tree-form through electrical signal input/output terminals.

A plurality of optical repeaters are provided in order to provide a plurality of serial interface cable connection terminals in the outlet box. In this case, the optical repeaters are mutually connected in-daisy chain, using the electrical signal input/output terminals in a similar manner used in the electrical distribution board. As a result, effects similar to those obtained by the electrical distribution board can be obtained

Structure 15

In the outlet box according to Structure 12 or Structure 13, the electrical signal input/output terminals are IEEE 1394 serial interface cable connection terminals.

It is the same as Structure 5.

Structure 16

In the outlet box according to Structure 12 or Structure 13, at least one of the optical repeaters at an uppermost level has a bridge function whereby the network on an upstream side of the optical repeater at the uppermost level isolated in terms of network from the network on a downstream side of the optical repeater.

The bridge faction of the optical repeater restricts problems that may be caused by interruption of network operations within a specified range, in other words, within the outlet box, and prevents the problems from propagating through the entire network.

Structure 17

A plug with electrical cord, the plug being connected to one end of an electrical cord including a power supply line that supplies power source electrical power to an appliance and a signal cable that connects the appliance and an in-building network, and comprising an electrode plug that is electrically connected to the power supply line and a serial interface plug that is electrically connected to the signal cable.

This invention relates to plugs for in-building appliances, which may be inserted or pulled out from an outlet box. As a result, in-building appliances can be readily connected to the in-building network, such that control and data transmission by computer become possible. In this case, since the power supply line and the signal cable are provided in one body, users can connect or separate the in-building appliances without being aware of the in-building network.

Structure 18

In the plug with electrical cord according to Structure 17, the signal cable is an IEEE 1394 serial interface cable.

It is the same as Structure 5.

Structure 19

In the plug with electrical cord according to Structure 17, wherein an entire length of the serial interface plug is longer than an entire length of the electrode plug.

Structure 20

In the plug with electrical cord according to Structure 17, wherein an entire length of the serial interface plug is shorter than an entire length of the electrode plug.

Structure 21

A plug with electrical cord, the plug being connected to one end of an electrical cord including a power supply line that supplies power source electrical power to an appliance and a signal cable that connects the appliance and an in-building network, and comprising an electrode plug that is electrically connected to the power supply line and an optical connector that is connected to the optical fiber cable.

Structure 22

In the plug with electrical cord according to Structure 21, wherein an entire length of the optical connector is shorter than an entire length of the electrode plug.

Structure 23

In the plug with electrical cord according to Structure 21, wherein an entire length of the optical connector is longer than an entire length of the electrode plug.

Either one of them may preferably be longer than the other to provide a better operability. The entire length referred to above is a length of the insertion section as viewed in a direction in which they are inserted in the out let box.

Structure 24

An outlet box terminal board to be connected to a plug with electrical cord, the plug being connected to one end of an electrical cord including a power supply line that supplies power supply electrical power to an appliance and a signal cable that connects the appliance and an in-building network and comprising an electrode plug that is electrically connected to the power supply line and a serial interface plug that is electrically connected to the signal cable, the outlet box terminal board comprising: an electrode plug receptor section that is connected to an in-building electrical distribution cable and receives the electrode plug, and a serial interface cable connection terminal that is disposed adjacent the electrode plug receptor section and connected to an electrical signal input/output terminal of an optical repeater and receives the serial interface plug.

The use of the outlet box terminal board having the structure described above provides an environment in which, by using the plug with electrical cord, the user can connect an in-building appliance to the in-building network without being aware thereof. The outlet box terminal board may be mounted on a front face of the outlet box. Since the serial interface cable connection terminal is provided adjacent an insertion opening of the electrical plug receptor section, the electrode plug and the serial interface plug of the in-building appliance can be connected to the outlet box simultaneously when the plug is inserted in the electrode plug receptor section.

Structure 25

In the outlet box terminal board according to Structure 24, the electrical signal input/output terminal is an IEEE 1394 serial interface cable connection terminal.

It is the same as Structure 5.

Structure 26

In the outlet box terminal board according to structure 24, at least one of the optical repeaters at an uppermost level has a bridge function whereby the network on an upstream side of the optical repeater at the uppermost level isolated in terms of network from the network on a downstream side of the optical repeater.

The bridge faction of the optical repeater restricts problems that may be caused by interruption of network operations within a specified range, in other words, within the outlet box terminal board, and prevents the problems from propagating through the entire network.

Structure 27

An in-building network system comprising: an electrical distribution board that receives an electrical power cable that is connected to an electrical distribution line and a signal cable that is connected to a network and an outlet box that is connected to the electrical distribution board through in-building complex cables including an electrical distribution cable and an optical fiber cable, wherein the outlet box is equipped with an electrical plug receptor section that connects to an electrical plug and an optical fiber connector receptor section that receives an optical fiber connector; and a gate that opens an opening section of the optical fiber connector receptor section when a tip of the electrical plug is inserted in the electrical plug receptor section and closes the opening section of the optical fiber connector receptor section when the tip of the electrical plug is pulled out the electrical plug receptor section.

By this system, the optical fiber connector receptor section can be protected from dusts.

Structure 28

In the in-building network system according to Structure 24 or Structure 27, the electrical signal input/output terminal is an IEEE 1394 serial interface cable connection terminal.

It is the same as Structure 5.

Structure 29

An in-building network system comprising: an electrical distribution board that stores a signal cable connected to a communication network and an electrical power cable connected to electrical distribution cables, the electrical distribution board comprising in-building electrical distribution breakers inserted between the electrical power cable and in-building electrical distribution cables, a gateway that interfaces between the communication network and the in-building network, and a plurality of optical repeaters, each having a bi-directional conversion function between an electrical signal and an optical signal and having an electrical signal input/output terminal that is connected to an electrical signal input/output terminal for in-building network connection of the gateway and an optical signal input/output terminal that inputs and outputs a signal corresponding to an electrical signal provided by the bi-directional conversion function and is connected to an optical fiber cable of the in-building network; and an outlet box that stores an end of an in-building complex cable including the in-building electrical distribution cable and the optical fiber cable, the outlet box comprising an electrode plug receptor section that is connected to the in-building electrical distribution cable, a plurality of optical repeaters, each having a bi-directional conversion function between an electrical signal and an optical signal and having an optical signal input/output terminal that is connected to the optical fiber cable and an electrical signal input/output terminal that inputs and outputs an electrical signal corresponding to the optical signal provided by the bi-directional conversion function, and a pair of serial interface cable connection terminals that is connected to the electrical signal input/output terminal of the optical repeater.

The above is an in-building network system that is constructed with the electrical distribution board of Structure 1 and the outlet box of Structure 12.

Structure 30

An in-building network system comprising: an electrical distribution board that stores a signal cable connected to a communication network and an electrical power cable connected to electrical distribution cables, the electrical distribution board comprising in-building electrical distribution breakers inserted between the electrical power cable and an in-building electrical distribution cable, a gateway that interfaces between the communication network and the in-building network, and a plurality of optical repeaters, each having a bi-directional conversion function between an electrical signal and an optical signal and having an electrical signal input/output terminal that is connected to an electrical signal input/output terminal for in-building network connection of the gateway and an optical signal input/output terminal that inputs and outputs a signal corresponding to an electrical signal provided by the bi-directional conversion function and is connected to an optical fiber cable of the in-building network; and an outlet box that stores an end of an in-building complex cable including the in-building electrical distribution cable and the optical fiber cable, the outlet box comprising an electrode plug receptor section that is connected to the in-building electrical distribution cable, a plurality of optical repeaters, each having a bi-directional conversion function between an electrical signal and an optical signal and having an optical signal input/output terminal that is connected to the optical fiber cable and an electrical signal input/output terminal that inputs and outputs an electrical signal corresponding to the optical signal provided by the bi-directional conversion function, and a serial interface cable connection terminal that is connected to the electrical signal input/output terminal of the optical repeater.

It is the in-building network system that is constructed with the electrical distribution board of Structure 1 and the outlet box of Structure 12.

Structure 31

An in-building network system comprising: an electrical distribution board that stores an end of an electrical power cable connected to an electrical distribution cable, the electrical distribution board comprising in-building electrical distribution breakers inserted between the electrical power cable and an in-building electrical distribution cable, a gateway that interfaces between the communication network and the in-building network, a plurality of optical repeaters, each having a bi-directional conversion function between an electrical signal and an optical signal between an electrical signal input/output terminal and an optical signal input/output terminal, and having an electrical signal input/output terminal that is connected to an electrical signal input/output terminal for in-building network connection of the gateway, wherein the optical signal input/output terminal is connected to an optical fiber cable of the in-building network, and wherein the gateway is externally attached to a casing that stores the in-building distribution breaker and the optical repeater; and an outlet box that stores an end of an in-building complex cable including the in-building electrical distribution cable and the optical fiber cable, the outlet box comprising an electrode plug receptor section that is connected to the in-building electrical distribution cable, a plurality of optical repeaters having a bi-directional conversion function between an electrical signal and an optical signal and having an optical signal input/output terminal that is connected to the optical fiber cable and an electrical signal input/output terminal that inputs and outputs an electrical signal corresponding to the optical signal provided by the bi-directional conversion function, and a serial interface cable connection terminal that is connected to the electrical signal input/output terminal of the optical repeater.

It is the in-building network system that is constructed by the electrical distribution board of Structure 2 and the outlet box of Structure 12.

Structure 32

In the in-building network system according to any one of Structure 29 through Structure 31, the electrical distribution board and the outlet box are both equipped with an independent power supply source for driving the optical repeater stored therein.

Structure 33

In the in-building network system according to any one of Structure 29 through Structure 31, the electrical distribution board and the outlet box are both equipped with an independent power supply source for driving the optical repeater stored therein, wherein electrical power is supplied to the independent power supply source from the in-building electrical distribution cable.

Structure 34

A table tap comprising: an electrical cord including a power supply line that supplies power supply electrical power to an appliance and a signal cable that connects the appliance and an in-building network; a plug connected to one end of the electrical cord and having an electrode plug that is electrically connected to the power supply line and a serial interface plug that is electrically connected to the signal cable; and a tap that is connected to the other end of the electrical cord and having an electrode plug receptor section that is electrically connected to the power supply line and a serial interface cable connecting terminal that is electrically connected to the signal cable.

Structure 35

A table tap comprising: an electrical cord including a power supply line that supplies power supply electrical power to an appliance and an optical fiber cable that connects the appliance and an in-building network; a plug connected to one end of the electrical cord and having an electrode plug that is electrically connected to the power supply line and a male optical connector that is connected to the optical fiber cable; and a tap that is connected to the other end of the electrical cord and having an electrode plug receptor section that is electrically connected to the power supply line and an optical fiber connector receptor section that is connected to the optical fiber cable.

The table taps may have the structures similar to those of the outlet boxes.

Structure 36

An in-building network system comprising: an electrical distribution board that receives an electrical power cable that is connected to an electrical distribution line and a signal cable that is connected to a network and an outlet box that is connected to the electrical distribution board through in-building complex cables including an electrical distribution cable an optical fiber cable, wherein the outlet box stores an end of the in-building complex cable and having an electrode plug receptor section that is connected to the in-building electrical distribution cable and a serial interface cable connection terminal for in-building network; an electrical cord including a power supply line that supplies power supply electrical power to an appliance and a signal cable that connects the appliance and the in-building network; a plug to be connected to the outlet box, being provided at one end of the electrical cord, and having an electrode plug that is electrically connected to the power supply line and a serial interface plug that is electrically connected to the signal cable; and an appliance that is connected to the other end of the electrical cord.

Structure 37

An in-building network system comprising: an electrical distribution board that receives an electrical power cable that is connected to an electrical distribution line and a signal cable that is connected to a network and an outlet box that is connected to the electrical distribution board through in-building complex cables including an electrical distribution cable an optical fiber cable, wherein the outlet box stores an end of the in-building complex cable and having an electrode plug receptor section that is connected to the in-building electrical distribution cable and an optical fiber connector receptor section for in-building network; an: electrical cord including a power supply line that supplies power supply electrical power to an appliance and an optical fiber cable that connects the appliance and the in-building network; a plug to be connected to the outlet box, being provided at one end of the electrical cord, and having an electrode plug that is electrically connected to the power supply line and an optical fiber connector that is connected to the optical fiber cable; and an appliance that is connected to the other end of the electrical cord.

Structures 36 and 38 represent structures including appliances.

Embodiments of the present invention are described hereunder with reference to concrete examples.

FIG. 1 shows a block diagram illustrating an internal structure of an electrical distribution board that is used for an in-building network system of the present invention.

A communication network 1 is, for example, a public telephone line or a CATV cable network. An electrical distribution line 2 is an electric line for power supply that supplies commercial electric power from a power supply that is installed on an electric pole or the like. A power cable 3 is a power service line. Electric power is transmitted through the power cable 3 into an electrical distribution board 10. A signal cable 9 is formed from, for example, an optical fiber or coaxial cable. The electrical distribution board as shown in the figure stores terminals of the power cable 3 that is connected to the electrical distribution line 2 and the signal cable 9 that is connected to the communication network 1. In this example, a complex cable that combines the power cable 3 and the signal cable 9 is used as the power service line 4.

Three in-building electrical distribution breakers 12, for example, are connected to the electrical distribution board 10. The breakers are installed for safety reasons when the power cable 3 is connected to an in-building electrical distribution cable 6. The power cable 3 is connected to one ends of the in-building electrical distribution breakers 12. The other ends of the in-building electrical distribution breakers 12 are connected in parallel to three in-building electrical distribution breakers 12A, 12B, 12C. The in-building power distribution breakers 12, 12A, 12B and 12C are mutually connected in the same manner as in the existing power distribution board.

On the other hand, the signal cable 9 is connected to one end terminal 11A of a gateway 11. The gateway 11 connects a communication path between the exterior and interior networks and functions as an interface that performs, for example, a conversion of the protocol of signals, a conversion of transmission methods, and the like. The structure itself is well known and therefore the description thereof is omitted. The other end terminal 11B of the gateway 11 is a terminal that can be connected to, for example, a standard IEEE 1394 serial interface cable.

Furthermore, three optical repeaters 13A, 13B and 13C are provided in the electrical distribution board 10. The three optical repeaters 13A, 13B and 13C each have a bi-directional conversion function between electrical signal and optical signal.

An IEEE 1394 optical repeater is composed of a LSI (large-scale integrated circuit) having a function of physical layers as main bodies. Functions that can be integrated in an integrated circuit can be provided with protocol conversion function between IEEE 1394.a and IEEE 1394.b and bridge function depending on requirements.

When changes occur in the nodes that are connected to the IEEE 1394 network upon disconnection or connection of the serial interface cable, a bus reset may be generated and the network operation may be interrupted. When a bus reset is generated, the network cannot be used for a predetermined period of time, and communication becomes impossible. The bridge function of the optical repeaters prevents the problems, which are generated as a result of the interruption of the network operation, from propagating through the entire network. In other words, the bridge function can isolate the network on the upstream of the optical repeater having the bridge function from the network on the downstream of the optical repeater in terms of network such that the range where the bus reset is generated is restricted. In ordinary homes, it can be assumed that nodes are changed at random timings. Therefore, each of the rooms may preferably be provided with the bridge function so that influences of the bus reset generated in certain rooms may not be transferred to another room. Also, the bridge function increases the node number limitations determined by IEEE 1394 standard, whereby the number of the signal connection terminals that can be provided in an outlet box in the in-building network can be substantially increased.

An electrical signal input/output terminal connects to an IEEE 1394 serial interface cable and has functions to transmit signals in bi-directions. An electrical signal input/output terminal 14A of the optical repeater 13A connects to a terminal 11B of the gateway 11. Also, an electrical signal input/output terminal 15A of the optical repeater 13A connects to an electrical signal input/output terminal 14B of the next optical repeater 13B. An electoral signal input/output terminal 15B of the optical repeater 13B connects to an electrical signal input/output terminal 14C of the next optical repeater 13C. In other words, the three optical repeaters 13A, 13B, 13C are connected in daisy chain through the electrical signal input/output terminals 14A, 15A, 14B, 15B, 14C, 15C. It is noted that the optical repeaters 13A, 13B, 13C can be connected in a tree form. In this case, optical signal input/output terminals and electrical signal input/output terminals may be increased in number depending on the requirements. The electrical signal input/output terminal may be prepared for connection of one or two cables, or one pair of two pairs of cables shown in FIG. 2.

Optical signal input output terminals 16A, 16B, 16C of the respective optical repeaters 13A, 13B, 13C are connected to optical fiber cables 7 of the in-building network. FIG. 1 shows only one fiber cable 7 and illustration of other fiber cables is omitted. It is noted that the in-building network means a complex network for in-building electrical wiring and data communication network, which is constructed by the in-building electrical distribution cable 6 and the optical fiber cable 7. In the example embodiment shown in FIG. 1, the in-building complex cable 5 that includes the in-building electrical distribution cable 6 and the optical fiber cable 7 is used for the in-building network. As a result, data communication networks can be implemented simultaneously when the wire installation work is conducted. The optical signal input/output terminal may be prepared for connection of one or two cables, or one pair of two pairs of cables shown in FIG. 2.

IEEE 1394 serial interface cables that use copper lines are not permitted to have a length greater than 4.5 m as the standard requirements. In this connection, in the example embodiment, the optical fiber cable 7 that has few signal attenuation or deterioration is used to connect data communication networks among the electrical distribution board 10, junction boxes and outlet boxes.

On the other hand, the interior space of the electoral distribution board 10 is narrow, cables having a length of 4.5 m of less can be used to connect the optical repeaters 13. In the embodiment example shown in FIG. 1, the three optical repeaters 13A, 13B, 13C are mutually connected in daisy chain by using IEEE 1394 serial interface cables that use copper lines through the electrical signal input output terminals 14, 15. As a result, nodes of the data communication network can be stored in the electrical distribution board at low costs. Connection works and expansion works are readily conducted and therefore optical fiber cables 7 can be installed in many different routes.

The optical repeaters 13A, 13B, 13C shown in FIG. 1 require driving power supply. Since the electrical distribution board 10 has some empty space, a power supply 18 that converts AC power supply from the power cable 3 into DC power supply is mounted therein, whereby driving power is supplied to all of the optical repeaters 13A, 13B, 13C and the gateway 11 within the electrical distribution board 10.

The IEEE 1394 serial interface cables that use copper lines can supply electrical power from one side to the other side. Therefore, one of the three optical repeaters 13A, 13B, 13C connected in daisy chain, for example the optical repeater 13A, can be supplied with the driving electrical power from the power supply 18, and the driving electrical power may be supplied to the other optical repeaters 13B and 13C through the IEEE 1394 serial interface cables.

In embodiments described below, in-building complex cables that include optical fiber cables 7 are used to connect the electrical distribution board, junction boxes and outlet boxes. Therefore, since the data communication network is electrically isolated by the optical fiber cables 7, electrical power cannot be mutually supplied between the electrical distribution board, the junction boxes and the outlet boxes. However, the junction boxes and the outlet boxes connect to in-building electrical distribution cables 6 by the in-building complex cable 5. Therefore, the electrical distribution board, the junction boxes and the outlet boxes can be provided with individual power supplies to drive the optical repeaters, independently.

Figures 2A, 2B, 2C:
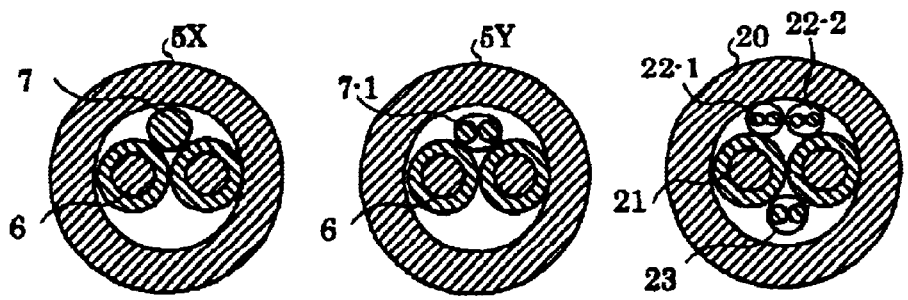
FIGS. 2(a) and (b) show cross-sectional views of different examples of in-building complex cables, respectively.
FIG. 2(c) shows a cross-sectional view of an electrical cord including IEEE 81394 serial interface cables that are described later.
Figure 2D:
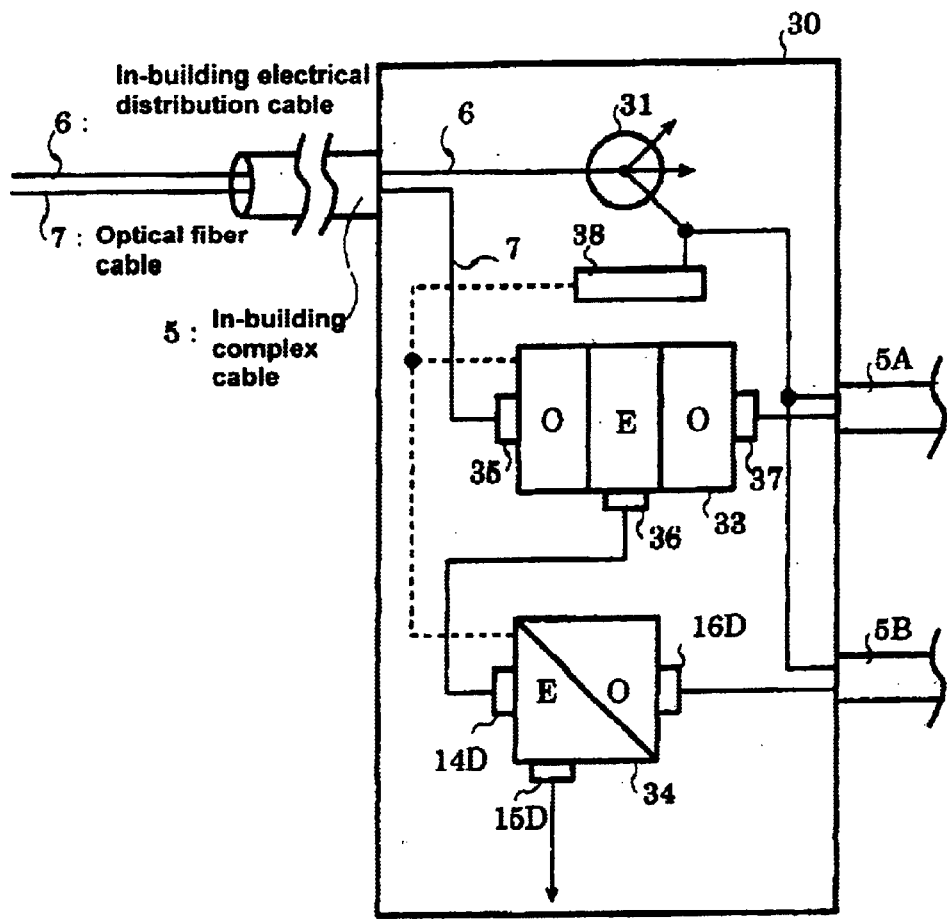
FIG. 2(d) shows a block diagram of an internal structure of a junction box.

FIG. 2(a) and FIG. 2(b) respectively show cross-sectional views of different embodiments of in-building complex cables. FIG. 2(c) shows a cross-sectional view of a power cable including IEEE 1394 serial interface cables to be described later. FIG. 2(d) shows a block diagram of an internal structure of the junction box.

The in-building complex cables 5X, 5Y shown in FIGS. 2(a) and (b) are cables including in-building electrical distribution cables 6 and optical fiber cables 7. The in-building complex cable 5X shown in FIG. 2(a) is a cable that is presumably used for transmission and reception of optical signals in half-duplex system. The optical fiber cable 7 in this example is formed from one optical fiber. The in-building complex cable 5Y shown in FIG. 2(b) includes an optical fiber cable 7-1 formed from a pair of optical fibers for optical signal transmission and optical signal reception enclosed in the cable. The in-building complex cable 5Y shown in FIG. 2(b) can reduce transmission skews and loss differences.

The in-building complex cable 5X and the in-building complex cable 5Y are used mainly to connect between the electrical distribution board, junction boxes and outlet boxes in buildings.

An electrical cord 20 shown in FIG. 2(c) has a power supply line 21, two twist pair lines 22-1 and 22-2 and one power line 23. This cable is mainly used to connect in-building appliances and outlet boxes. The electrical cord 20 is shielded at the grounding potential. The twist pair lines 22-1 and 22-2 are lines that are used for signal transmission and reception for data communication networks. Also, the power line 23 includes a conduction body that transmits DC power supply of about 5 V to 3V, and a conduction body for recognizing the data transmission speed. Appropriate ones of the lines that compose the electrical cord 20 may be omitted depending on the requirements.

In other words, the cable that is used to connect between an in-building appliance and an outlet box may be a complex cable that includes a power line that supplies power to drive the in-building appliance, a power line that supplies power to drive a data processing apparatus that is implemented in the in-building appliance and a signal line that is used to connect the data processing apparatus implemented in the in-building appliance to the data communication network.

Also an in-building appliance may have a built-in power supply for driving a data processing apparatus that is implemented in the appliance. A cable that is used to connect between this type of appliance and an outlet box may be a complex cable that includes a power line that supplies power to drive the in-building appliance and a signal line that is used to connect the data processing apparatus implemented in the appliance to the in-building data communication network. A cable that may be used to connect between an appliance of the type in which an AC/DC adapter is connected to an outlet box may preferably be a complex cable that includes a power line that supplies DC power to drive the appliance, a power line that supplies power to drive the data processing apparatus implemented in the in-building appliance, and a signal line that is used to connect the data processing apparatus implemented in the in-building appliance to the in-building data communication network. A cable combining a serial interface cable and a power line that supplies power may be used for these cables. Also, a cable that combines an optical fiber cable and a power line that supplies power may be used.

The junction box 30 shown in FIG. 2(d) stores terminals of the in-building complex cable 5 including the in-building electrical distribution cable 6 and the optical fiber cable 7.

The junction box 30 receives the in-building complex cable 5 that is connected to the electrical power distribution board 10, and transmits electrical power toward two in-house complex cables 6, and have a function to connect to the data communication network. A distributor 31 is connected to the in-building electrical distribution cable 6 in the junction box 30. The distributor 31 distributes power received through the in-building electrical distribution cable 6. Furthermore, an optical repeater 33 and an optical repeater 34 are provided in the junction box 30. The optical repeater 33 has two optical signal input/output terminals 35 and 37 and one electrical signal input/output terminal 36. The optical repeater 34 has one optical signal input/output terminal 16D and two electrical signal input/output terminals 14D and 15D. The optical repeater 33 and the optical repeater 34 have the same bi-directional electrical-optical signal conversion function and bridge functions as those of the optical repeaters 13A, 13B, 13C provided in the electrical distribution board 10.

In the illustrated example, the optical signal input/output terminal 37 of the optical repeater 33 is connected to the in-building complex cable 6A. The in-building complex cables 5A and 5B are cables that have the same structure as that of the in-building complex cable 5 and are wired toward different routes.

The electrical signal input/output terminal 36 of the optical repeater 33 is connected to the electric signal input/output terminal 14D of the optical repeater 34 such that the optical repeaters 33 and 34 are connected in daisy chain. The optical signal input/output terminal 37 on the optical repeater 33 is connected to an optical fiber cable of the in-building complex cable 5A. The optical signal input/output terminal 16D of the optical repeater 34 is connected to an optical fiber cable of the in-building complex cable 5B. All the optical repeaters 33 and 34 are supplied with driving electrical power from a power supply 38 that receives electric power through the in-building electrical distribution cable 6 and performs AC/DC conversion.

Figure 3:
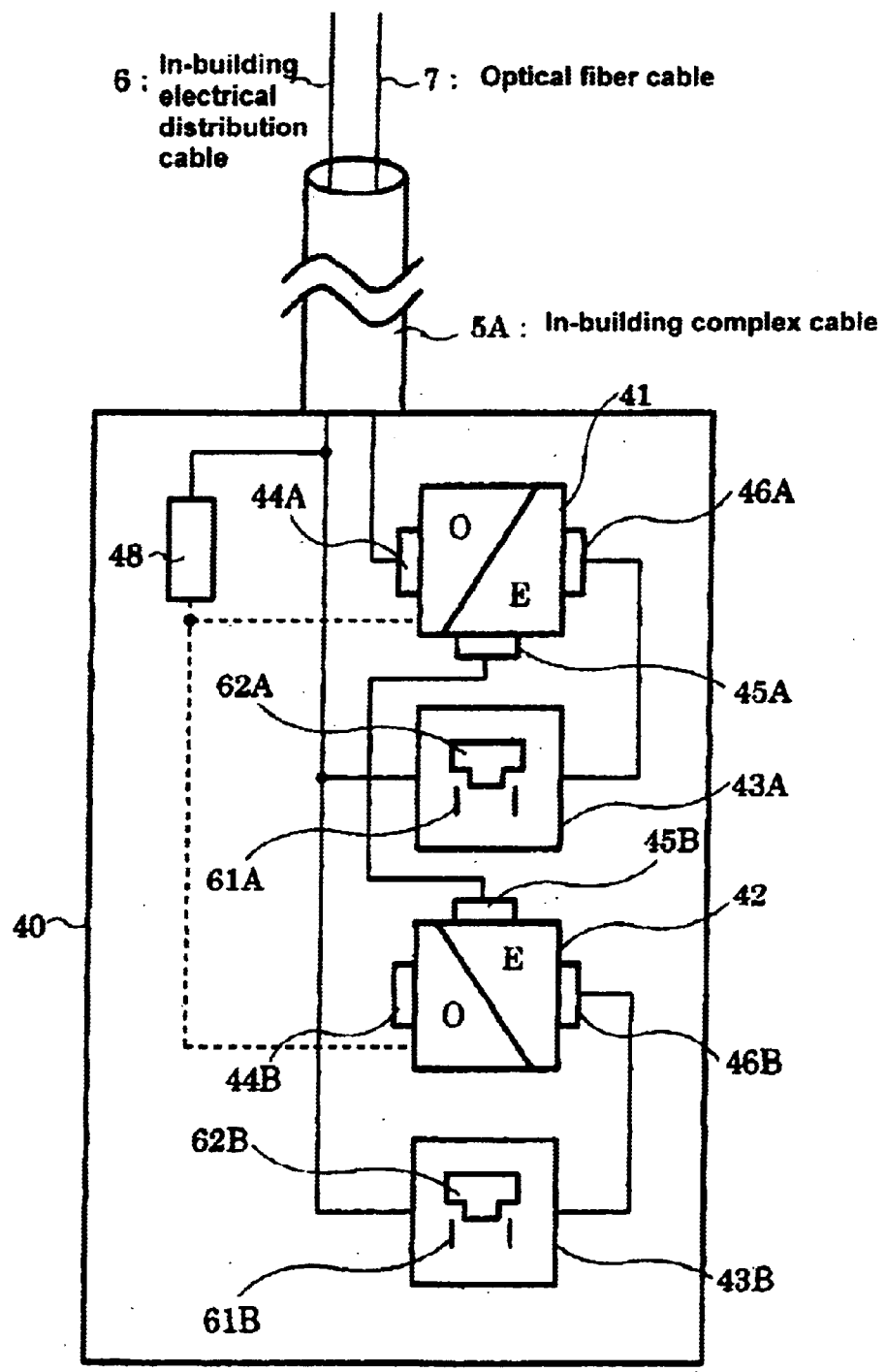
FIG. 3 shows a block diagram of an internal structure of an outlet box.

FIG. 3 shows a block diagram of one example of an internal structure of an outlet box.

The illustrated outlet box 40 stores terminals of the in-building complex cable 5A that includes the in-building electrical distribution cable 6 and the optical fiber cable 7. The outlet box 40 may preferably have the same size as a standard sized electrical distribution outlet box, because it is easy to replace with the existing facility. The outlet box 40 is provided with two terminal boards 43A and 43B and two optical repeaters 41 and 42. The terminal boards 43A and 43B are provided with electrode plug receptor sections 61A and 61B and serial interface cable connection terminals 62A and 62B, respectively. Also, all of the optical repeaters 41 and 42 are supplied with driving electrical power from a power supply 48 that receives electrical power through the in-building electrical distribution cable 6 and performs AC/DC conversion. It is noted that the driving electric power may be supplied through an electrical cable of an in-building appliance.

The in-building electrical distribution cable 6 is electrically connected to the electrode plug receptor sections 61A and 61B. The electric signal input/output terminal 45A of the optical repeater 41 is electrically connected to the electric signal input/output terminal 45B of the optical repeater 42, such that the optical repeaters 41 and 42 are mutually connected in daisy chain. The remaining electrical signal input/output terminal 46A of the optical repeater 41 is connected to the serial interface cable connection terminal 62A of the terminal board 43A. The remaining electrical signal input/output terminal 46B of the optical repeater 42 is connected to the serial interface cable connection terminal 62B of the terminal board 43B.

FIG. 4 shows a structure of a plug that is connected to an outlet box and an internal structure of the outlet box. FIG. 4(a) shows a front view of the plug, FIG. 4(b) shows a side view of a main portion of the plug with an electrical code, FIG. 4(c) shows a front view of the outlet box, and FIG. 4(d) schematically shows a side view of a main portion of the outlet box.

As shown in FIG. 4(b), the plug 50 is connected to one end of the electrical cord 20. The electrical cord 20 includes a power supply line 21 that supplies power supply electric power to an appliance (not shown) and a signal cable 22 that connects the appliance to the data communication network. The plug 50 is equipped with an electrode plug 52 that is electrically connected to the power supply line 21 and a serial interface plug 51 that is electrically connected to the signal cable 22.

It is noted that FIG. 4 shows a preferred embodiment of the present invention, and the positional relationship between the serial interface plug 51 and the electrode plug 52 maybe optionally decided. In other words, the serial interface plug 51 and electrode plug 52 may be disposed up and down in their inverted positions depending on the designs of the outlet box terminal board 60, or may be disposed left and right next to each other. Also, in the example shown in FIG. 4, the entire length of the serial interface plug 51 is slightly longer than the entire length of the electrode plug 52 (for example, about 5 mm longer). This provides a structure, in which the serial interface plug 51 is inserted first, which is preferred when it is desirous that the positioning thereof is readily conducted. However, they may have the same lengths. Also, in contrast with the example shown in the figure, the entire length of the electrode plug 52 may be selected to be longer than the entire length of the serial interface plug 51 (for example, about 5 mm longer). This provides a structure in which the strong electrode plug 52 is inserted first, which is preferred when it is desirous that the serial interface plug 51 is not subject to an excessive force.

Detailed structures of the electrode plug 52 and serial interface plug 51 are the same as the known structures, and therefore their descriptions are omitted.

As shown in FIG. 4(c), the outlet box terminal board 60 is disposed on a front face of the outlet box 40 shown in FIG. 3. The outlet box terminal board 60 has a serial interface cable connection terminal 62 that is disposed adjacent an electrode plug receptor section 61. The electrode plug receptor section 61 receives the electrode plug 52 of the plug 50. Also, the serial interface cable connection terminal 62 receives the serial interface plug 51 of the plug 50. As shown in FIG. 4(d), a known electrical distribution part is used for the electrode plug receptor section 61. The serial interface cable connection terminal 62 is provided in the remaining space of the outlet box 40. Reference numerals 63 and 64 denote dielectric covers, respectively. The serial interface cable connection terminal 62 is connected to the electrical signal input/output terminal 46A of the optical repeater 41 shown in FIG. 3, for example. Also, the electrode plug receptor section 61 is connected to the in-building electrical distribution cable 6 shown in FIG. 3, for example.

When the plug 50 and the terminal board 60 are provided with the structures shown in FIG. 4, in-building appliances can be readily connected to the in-building network, such that the in-building appliances can be controlled by the computer and receive and transmit data using the data communication network. The electrical cord 20 integrates the power supply line 21 and the signal cable 22, and therefore the user can connect or disconnect in-building appliances to the power supply without being aware of the data communication network with ordinary feeling.

Figure 5:
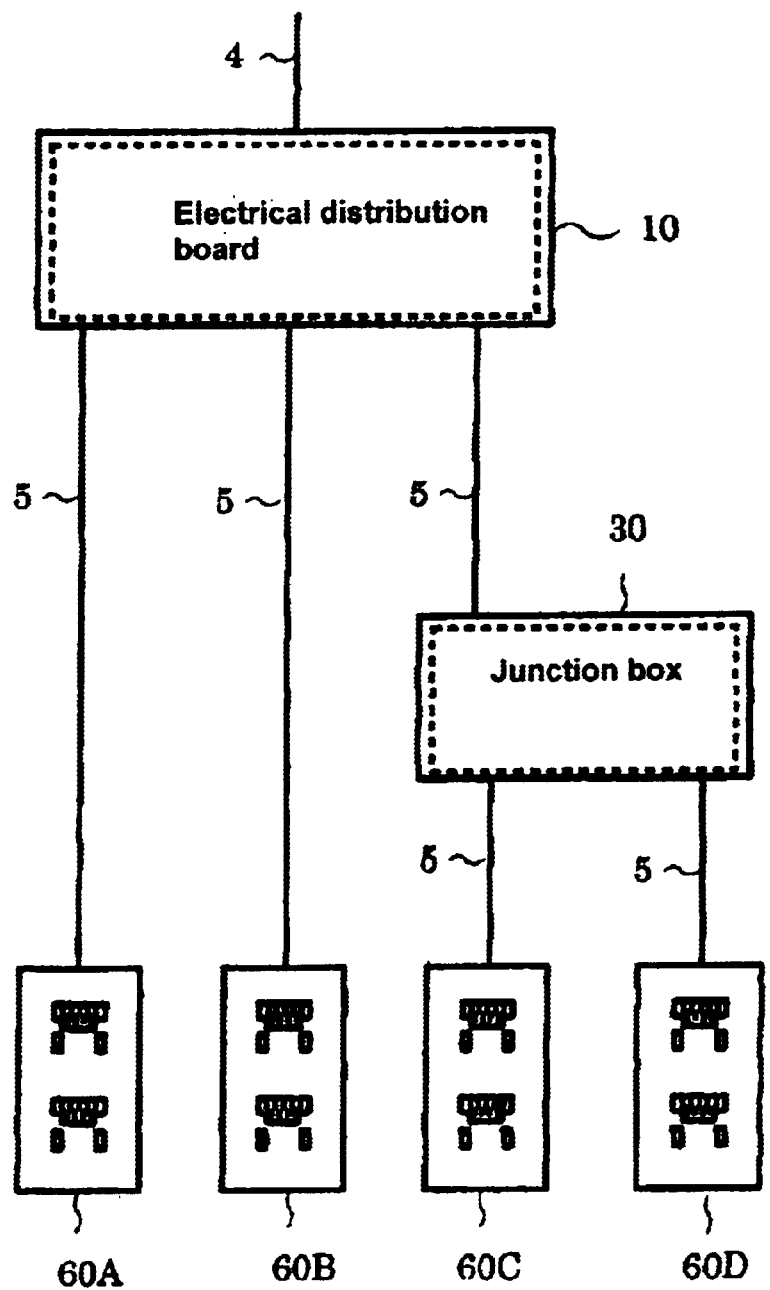
FIG. 5 shows a block diagram of an entire structure of an in-building network system according to the present invention.

FIG. 5 shows a block diagram of an example structure of the entire in-building network system of the present invention.

As shown in the figure, the electrical distribution board 10, the junction box 30 and outlet boxes 60A, 60B, 60C, 60D, which are described above in detail, are mutually connected using the in-building complex cables 5. The distribution board 10 is connected to the service line 4. By using a combination of these elements, an easy-to-use in-building network in which expansion and switching of connections can be freely conducted can be constructed. It is noted that the junction box 13 may be used if required. In other words, it can be omitted.

Figure 6:
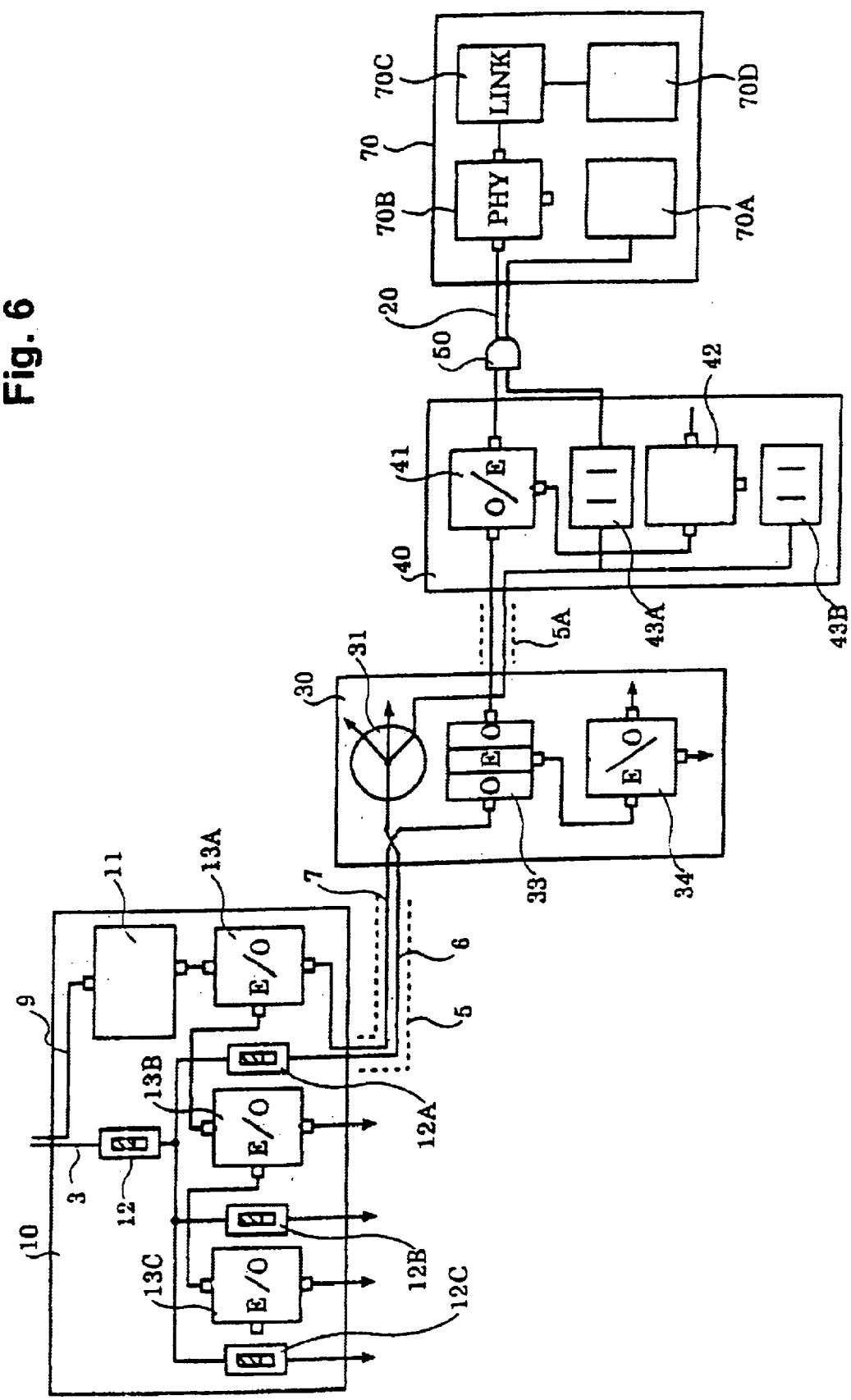
FIG. 6 shows an internal block diagram of an example of an in-building network system from an electrical distribution board 10 to an in-building appliance 70.

FIG. 6 shows an internal block diagram of an example of an in-building network system from the electrical distribution board 10 to an in-building appliance 70.

The electrical distribution board 10 and the junction box 30 in the figure are connected by the in-building complex cable 5. The electrical distribution board 10 has an internal structure that is the same as the one shown in FIG. 1, and therefore the same reference numbers are used for the same parts. The junction box 30 and the outlet box 40 are connected by the in-building complex cable 5A. The junction box 30 and the outlet box 40 have structures that are the same as those shown in FIG. 1, and therefore the same reference numbers are used for the same parts. The electrical cord 20 of the in-building appliance 70 is connected to the outlet box 40 by a plug 50. An appliance main body 70A, a data communication interface 70B, a data link 70C and a data processing section 70D are provided in the in-building electrical appliance 70. The appliance main body 70A is supplied with driving electrical power through the in-building electrical distribution cable described above. In the case of a TV receiver, TV broadcasting is received by the TV receiver. On the other hand, the data processing section 70D may be connected to an external communication network through, for example, an optical fiber cable or the like described above to enable reading of Internet data by a display of the TV receiver. Also, recording control or the like is enabled by a computer in another room.

Figure 7:
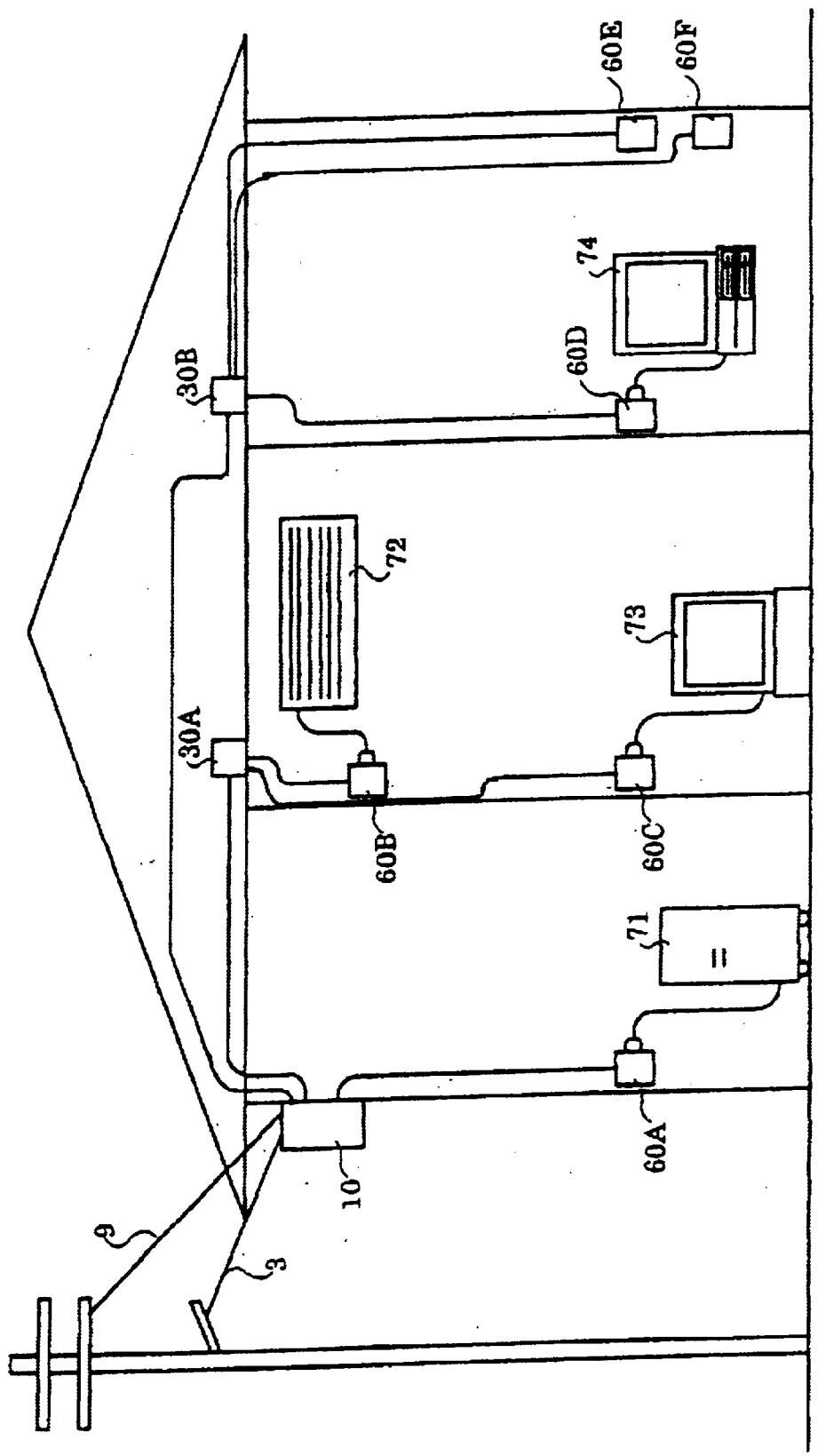
FIG. 7 shows a general idea of an in-building network system used in a general home.

FIG. 7 shows a conceptual structure of the in-building network system that is used in an ordinary home.

As shown in the figure, outlet boxes in an optional number are installed at optional places in each of the rooms of the house. For example, a refrigerator 71 is connected to an outlet box 60. An air conditioner 72 is connected to an outlet box 60B. A TV set 73 is connected to an outlet box 60C. A personal computer 74 is connected to an outlet box 60D. Any appliances may be connected to outlet boxes 60D and 60F.

The outlet box 60A is directly connected to the electrical distribution board 10. The outlet box 60B and the outlet box 60C are connected to the electrical distribution board 10 through the junction box 30A. The Outlet box 60D and the outlet box 60E and 60F are connected to the electrical distribution board 10 through the junction box 30B. The electrical distribution board 10 receives the power cable 3 and the signal cable 9 from the exterior. In this manner, an in-building network is constructed, such that, for example, the air conditioner 72 and the TV set 73 can be controlled through the Internet from an outside location.

Also, data is freely communicated within the house, such that, for example, items stored in the refrigerator 71 can be managed by the personal computer 74. In this case also, the electrical cord 20 of each appliance may be formed from a complex cable to facilitate connection and disconnection of the plug. Cable wirings among the outlet boxes, the junction boxes and the distribution board can be very much simplified by using complex cables. Also, they can be readily exchanged with the existing facility.

The example described above uses the IEEE 1394 serial interface. However, the present invention can be widely adapted to networks including cable networks that have the same functions and are able to use optical fiber cables. Interfaces of other appropriate standards, such as, USB interface, 10/100 Base-SX, Ethernet system such as Gbit, can also be used.

Also, when the power supplies that are provided in the electrical distribution board 10, the junction boxes 30 and the outlet boxes 40 may be provided in the form of rechargeable batteries, for example, such power supplies can provide interruptible power supplies as individual data communication network.

In the example shown in FIG. 4, the signal cable 22 within the electrical cord 20 may be formed from a twist pair line. However, this can be formed from an optical fiber cable (crystal or plastic optical fiber). In this case, serial interface cable connection terminals of the outlet boxes may be formed from optical connectors with dust-proof measures being implemented.

Figure 8A:
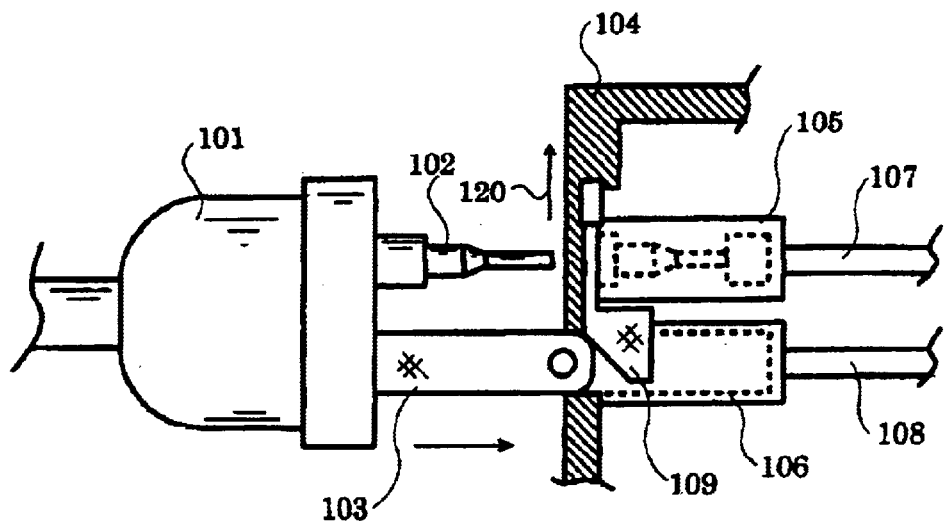
FIG. 8(a) shows a side view of a plug and a cross-sectional view in part of an outlet box, and FIGS. 8(b) and (c) show front views in part of the outlet box in use.
Figure 8B:
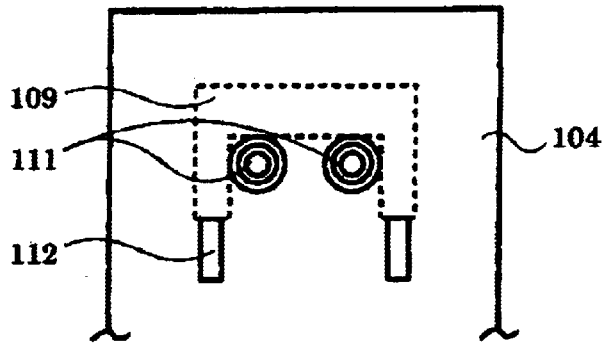
FIG. 8 shows examples in which an optical fiber cable is used as a signal cable within an electrical cord.
Figure 8C:
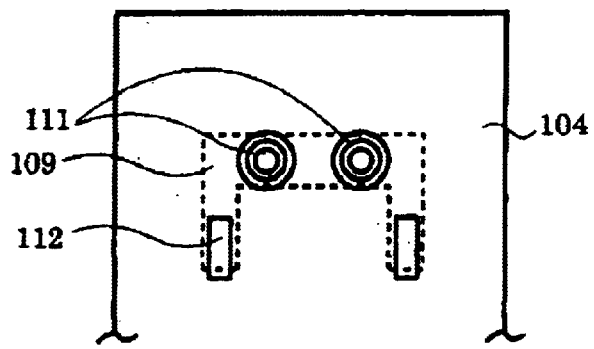

FIG. 8 shows embodiments that use optical fiber cables as signal cables within electrical cords. FIG. 8(a) shows a side view of a plug and a cross-sectional view in part of an outlet box, and FIGS. 8(b) and 8(c) show front views in part of the outlet box in use.

As shown in the figure, the plug 101 is provided with a male-type optical fiber connector 102 and an electrical plug 103. The electrical plug 103 is slightly longer than the optical fiber connector 102. An outlet box 104 is provided with an optical fiber connector receptor section 106 and an electrical plug receptor section 106. The optical fiber connector receptor section 105 is connected to the optical fiber cable 107. The electrical plug receptor section 106 is connected to an in-building electrical distribution cable 108.

When the electrical plug 103 is inserted in an opening 112 of the electrical plug receptor section 106, the tip of the electrical plug 103 initially contacts a gate 109. The gate 109 is supported in a manner slidable in the direction of an arrow 120. Therefore, when the tip of the electrical plug 103 contacts a wedge shaped lower end section of the gate 109, the gate 109 moves upward in the direction of the arrow 120 to thereby open an opening section 111 of the optical fiber connector receptor section 105. FIG. 8(b) shows such a state. Also, when the electrical plug 103 is pulled out the electrical plug receptor section 106, the gate 109 moves downward in the opposite direction of the arrow 120. In this matter, the opening section 111 of the optical fiber connector receptor section 105 is closed. FIG. 8(c) shows such a state. This structure provides a dust-proof measurement for the optical fiber connector receptor section of the outlet box. Also, since the opening section 111 of the optical fiber connector receptor section 105 is closed when a plug is not connected, accidents in which, for example, a laser beam leaks out through the opening section 111, and accidentally hits and damages the eyes of a person, can be prevented.

FIG. 9 shows a perspective view of a table tap in accordance with an embodiment of the present invention.

Figure 9A:
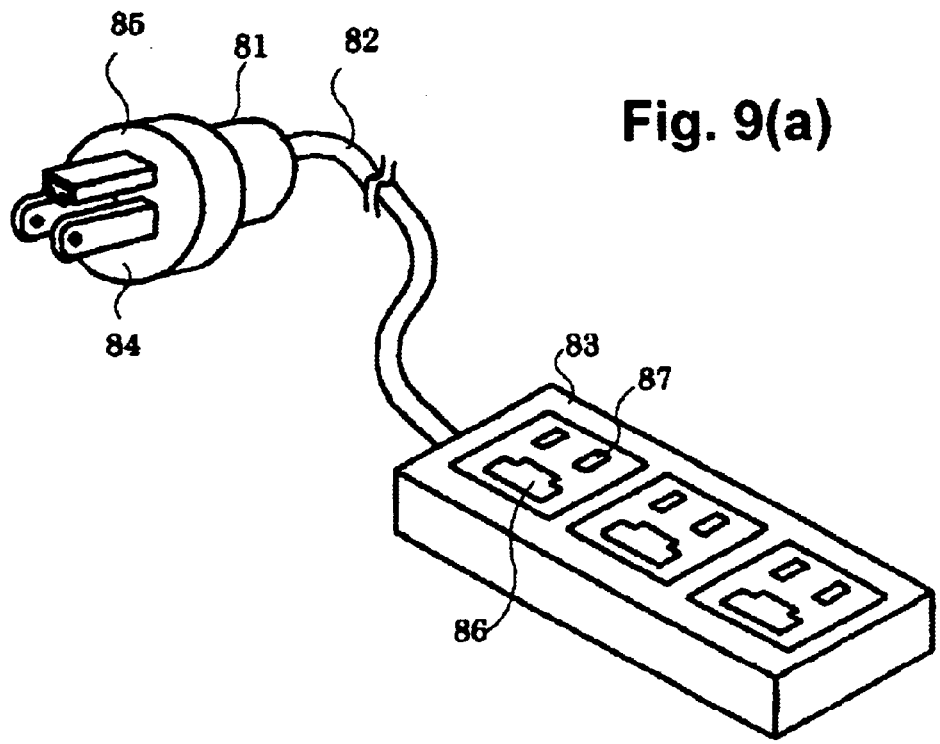
FIG. 9 shows a prospective view of an example of the table tap.
Figure 9B:
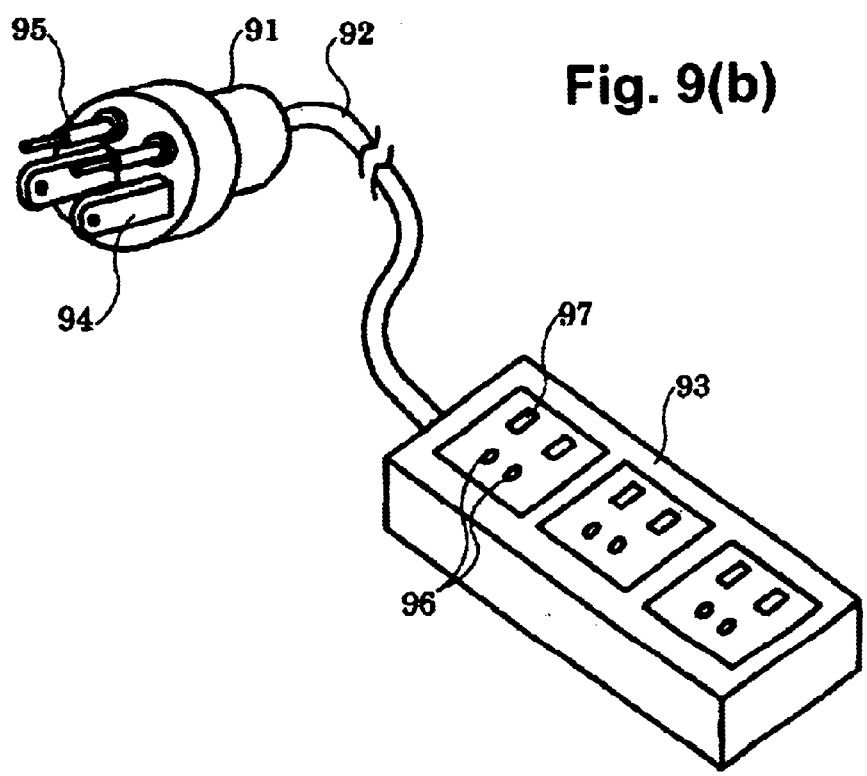

Referring to FIG. 9(a), a plug 81 and an electrical cord 82 having the same structures described above with reference to FIG. 4 are connected to a tap 83. More particularly, an electrode plug 84 and a serial interface plug 85 are provided on the plug 81. The electrical cord 82 is a complex cable including a power supply cable and a serial interface cable. The tap 83 in this example is equipped with three sets of serial interface cable connection terminals 86 and electrode plug receptor sections 87. On the other hand, in FIG. 9(b), a plug 91 is provided with an electrode plug 94 and a pair of male-type optical fiber connectors 95. An electrical cord 82 is a complex cable having a power supply cable and an optical fiber cable. The tap 83 in this embodiment is provided with three sets of optical fiber connector receptor sections 96 and electrode plug receptor sections 97. The table tap of this type can be handled in a similar manner as a conventional table tap for home electric appliances by the use of a complex cable that combines a cable for power supply and a cable for connecting to data communication networks. Furthermore, a small-scale in-building network can be readily constructed around desks.

Figure 10:
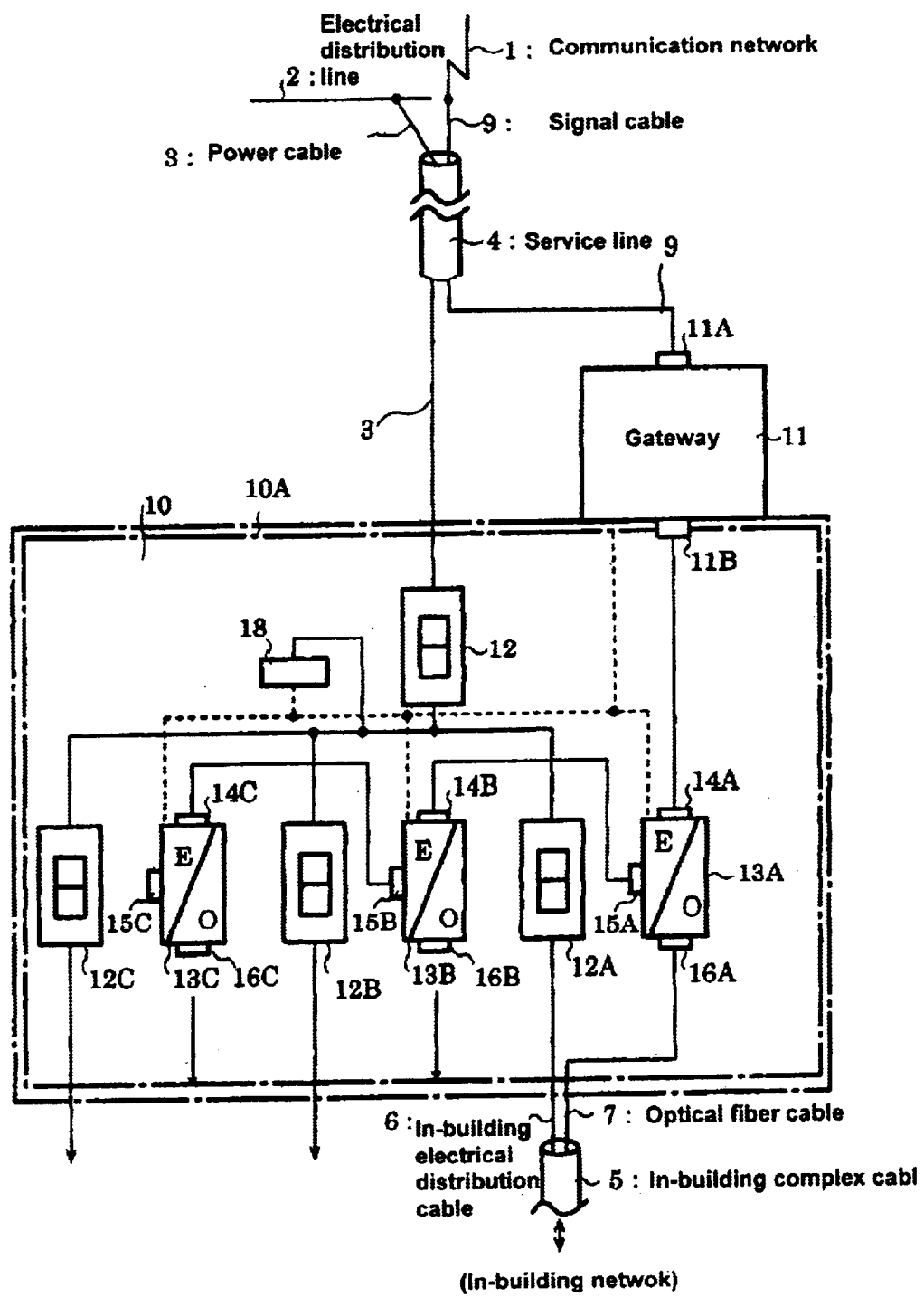
FIG. 10 shows a block diagram of a modified example of an electrical distribution board.

FIG. 10 shows a block diagram of a variation example of the above-described electrical distribution board. The same reference numbers are used in the illustrated apparatus for the same parts as those shown in FIG. 1. The illustrated embodiment is different from the embodiment shown in FIG. 1 in that a gateway 11 is externally attached to a case 10A of the electrical distribution board 10. This structure may preferably be used when the gateway 11 cannot be stored inside the electrical distribution board 10. In this case, the gateway 11 may receive supply of driving power from a power supply 18 that is provided inside the electrical distribution board 10.

The existing facility can be readily replaced with the systems described above. In other words, electrical distribution boards, junction boxes, or outlet boxes can be designed with the same standard and sizes of those of the existing ones, and therefore can replace the existing electrical distribution facility at low costs. Also, they can be implemented in houses that are built with standardized mass-produced building materials without modifying or changing their designs. In other words, a new structure or new space are not required. Also, since they are integrated with an electrical distribution facility, their costs become very law. Furthermore, the data communication network is not independently installed, therefore the user can use them without being aware of the network. Also, optical connectors may not necessarily be used at areas where appliances are connected or disconnected, and they are resistant to dusts and more stable when optical connectors are not used.

In addition, when an outlet box is manufactured with a structure according to the conventional standard, they can be used together with conventional in-building appliances. Also, serial interface connection terminals or the like may not necessarily be installed within substantially miniaturized in-building appliances. Furthermore, parts exchange for nodes in any one of the electrical distribution board 10, the junction boxes 30, and the outlet boxes. For example, high-speed signal line and interfaces can be used only in a room where a personal computer is placed. Also, each outlet may drive repeaters stored therein by its own power independence can be improved, and versions of and independently upgraded.

What is claimed is:

1. An electrical distribution board that stores ends of a signal cable connected to a communication network and an electrical power cable connected to electrical distribution cables, the electrical distribution board comprising:
   in-building electrical distribution breakers inserted between the electrical power cable and an in-building distribution cables;
   a gateway that interfaces the communication network with an in-building network; and a plurality of optical repeaters, coupled to the gateway, each of said optical repeaters having a bi-directional conversion function between an electrical signal and an optical signal that communicate between a first electrical signal input/output terminal and an optical signal input/output terminal, and wherein at least one of said optical repeaters have a second electrical signal input/output terminal connected to a third electrical signal input/output terminal of another of said optical repeaters for in-building network connection of the gateway, wherein the optical signal input/output terminal is coupled to an optical fiber cable of the in-building network.

2. An electrical distribution board that stores an end of an electrical power cable connected to electrical distribution cables, the electrical distribution board comprising:

an in-building electrical distribution breaker inserted between the electrical power cable and in-building electrical distribution cables;

a gateway that interfaces the communication network with an in-building network; and a plurality of optical repeaters, coupled to the gateway, each of said optical repeaters having a bi-directional conversion function between an electrical signal and an optical signal that communicate between a first electrical signal input/output terminal and an optical signal input/output terminal, and wherein at least one of said optical repeaters have a second electrical signal input/output terminal coupled to a third electrical signal input/output terminal of another of said optical repeaters for in-building network connection of the gateway, wherein the optical signal input/output terminal is coupled to an optical fiber cable of the in-building network, and wherein the gateway is externally attached to a casing that stores the in-building electrical distribution breakers and the optical repeaters.

3. An electrical distribution board according to claim 1 or claim 2, wherein the plurality of optical repeaters are coupled in daisy chain through the second and third electrical signal input/output terminals.

4. An electrical distribution board according to claim 1 or claim 2, wherein the plurality of optical repeaters are coupled in a tree-form through electrical signal input/output terminals.

5. An electrical distribution board according to claim 1 or claim 2, wherein the plurality of electrical signal input/output terminals are IEEE 1394 serial interface cable connection terminals.

6. An electrical distribution board according to claim 1 or claim 2, wherein each of the optical repeaters is isolated in terms of network from an upstream-side of the distribution board by a bridge function.

* * * * *